United States Patent [19]
Yokota et al.

[11] Patent Number: 5,994,488
[45] Date of Patent: Nov. 30, 1999

[54] PLASTIC ARTICLES FOR MEDICAL USE

[75] Inventors: Mitsuru Yokota; Nobuo Saito, both of Ostu, Japan

[73] Assignee: Toray Industries, Inc., Japan

[21] Appl. No.: 08/985,722

[22] Filed: Dec. 5, 1997

[30] Foreign Application Priority Data

| | | | |
|---|---|---|---|
| Dec. 6, 1996 | [JP] | Japan | 8-326674 |
| Jan. 31, 1997 | [JP] | Japan | 9-018610 |
| Jun. 6, 1997 | [JP] | Japan | 9-148738 |

[51] Int. Cl.$^6$ ............ C08F 30/08
[52] U.S. Cl. ............ 526/279; 351/160 R; 351/160 H
[58] Field of Search ............ 351/160 R, 160 H; 526/279

[56] References Cited

U.S. PATENT DOCUMENTS

| | | | |
|---|---|---|---|
| 4,543,398 | 9/1985 | Bany et al. | 351/160 H |
| 4,711,943 | 12/1987 | Harvey, III . | |
| 5,233,006 | 8/1993 | Wolter et al. | 526/279 |
| 5,451,617 | 9/1995 | Lai et al. | 526/279 |

FOREIGN PATENT DOCUMENTS

| | | |
|---|---|---|
| 0 387 706 | 9/1990 | European Pat. Off. . |
| 0 578 087 A2 | 1/1994 | European Pat. Off. . |
| 0 781 777A1 | 7/1997 | European Pat. Off. . |
| WO 96/31792 | 10/1996 | WIPO . |

*Primary Examiner*—Melvyn I. Marquis
*Attorney, Agent, or Firm*—Nixon & Vanderhye

[57] ABSTRACT

Plastic articles for medical use comprising a polymer, which polymer comprising units derived from an ethylenically unsaturated monomer having a chain containing amino and organosiloxane groups, wherein the monomer is represented by the following general formula:

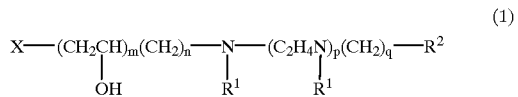

(1)

(where X is an ethylenically unsaturated polymerizable group; each $R^1$ is, independently, selected from a hydrogen atom, unsubstituted and substituted alyl groups, unsubstituted and substituted aryl groups and the groups $(CH_2)_rCOOR^3$ and $(CH_2)_rONR^4R^5$; each of m, n and p, independently, is selected from 0 and 1; each of q and r, independently, is any of zero and 1 to 10; and $R^2$ is a substituent group containing an organosiloxane group, each of $R^3$, $R^4$ and $R^5$, independently, is a group of $R^1$ or is a group having a heterocyclic group, or $R^4$ and $R^5$, together with the nitrogen atom to which they are attached form a heterocyclic group which may additionally contain any of oxygen, nitrogen, sulfur and silicon)

and further the general formula (1) satisfies one of the following features (i) to (iii),
(i) n=1
(ii) m and n are zero, and p is 1
(iii) m, n and p are zero, and $R^1$ is other than hydrogen or methyl.

19 Claims, No Drawings

PLASTIC ARTICLES FOR MEDICAL USE

FIELD OF THE INVENTION

The present invention relates to plastic articles (i.e. articles of plastics material) for medical use made of a new polymer, which are excellent in transparency and gas permeability and have good mechanical properties, and hence can be suitably used, for example, as ophthalmic lenses such as contact lenses and intra-ocular lenses, and to the polymer itself.

DESCRIPTION OF PRIOR ARTS

The material used for ophthalmic lenses such as contact lenses and intra-ocular lenses is required to have hydrophilicity for assuring good compatibility with the lachrymal fluid and for remaining free from deposition, gas permeability for supplying oxygen to the ocular tissue such as the cornea and for discharging metabolically produced carbonic acid gas, transparency required as optical lenses, and, in the case of contact lenses, good mechanical properties to stabilize the positioning in the eyes and to assure good handling convenience.

Among these properties, especially gas permeability is an important property since it greatly affects the safety of the cornea when the lenses are positioned in the eyes. One of widely used means for securing the gas permeability is to use a hydrogel. In the case of a hydrogel, since a gas is dissolved and diffused in the water contained inside for permeation, a higher water content assures a higher gas permeability coefficient. However, on the other hand, there are problems in that (1) if the water content is increased, mechanical strength tends to be lowered, and (2) if the thickness is reduced with an intention to improve the gas transmissibility (oxygen transmissibility is expressed by Dk/L, wherein Dk is oxygen permeability coefficient, and L is thickness), dehydration staining may be caused. Furthermore, it is also said that the stain such as proteins contained in lachrymal fluid is liable to be deposited.

Another method used for improving the gas permeability is to use a polymer containing silicon such as a silicone. In recent years, polymers containing a silyl substituted methacrylate such as tris(trimethylsiloxy)silylpropyl methacrylate or a modified polysiloxane as a component have been developed and used as plastic articles with oxygen permeability (JP-A60-142324 and JP-A-54-024047).

However, the polymers made from any of these monomers (macromers) present the following problems because of the nature of the silicone introduced for improving gas permeability: (1) since the silicone component is hydrophobic and water repellent, the surface is liable to be hydrophobic, and likely occurrences are that the lachrymal fluid is repelled and that the lipids in the lachrymal fluid are deposited, and (2) since the intermolecular action of the silicone component is small, the material is liable to be fragile and to be broken during handling or poor in impact resistance.

Attempts have also been made to copolymerize a hydrophilic monomer such as 2-hydroxyethyl methacrylate and silicon-containing monomers (macromers) as mentioned above. However, since the hydrophilic monomer has a polar group such as a hydroxyl group whereas the silicon moiety is low in polarity, such attempts at copolymerization have resulted in phase separation due to electrostatic repulsion, not allowing a transparent polymer to be obtained.

The present invention addresses the problem of overcoming the disadvantages of the above prior art and thus provide plastic articles for medical use with high transparency, high oxygen permeability, good wettability and excellent mechanical properties.

SUMMARY OF THE INVENTION

After intensive studies, we have found that plastic articles for medical use made of a copolymer with a specific monomer as a component have high transparency and oxygen permeability, and good wettability and mechanical properties.

The present invention provides plastic articles for medical use obtained by polymerizing an amine compound containing both a group with a polymerizable double bond and organosiloxane group.

The plastic articles for medical use of the present invention are made of a polymer having, as pendant or crosslinking functional groups, chains containing each of amino and organosiloxane groups. It is preferable that the amino group and organosiloxane group are arranged in this order from the main hydrocarbon chain skeleton of the polymer. The functional groups of the polymer are provided by a monomer represented by the following formulae:

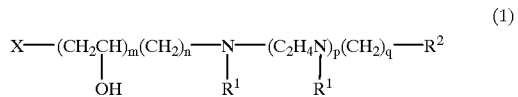

(where X is an ethylenically unsaturated polymerizable group; each $R^1$ is, independently, selected from a hydrogen atom, unsubstituted and substituted alyl groups, an unsubstituted and substituted aryl groups and the groups $(CH_2)_r COOR^3$ and $(CH_2)_r ONR^4R^5$; each of m, n and p, independently, is selected from 0 and 1; each of q and r, independently, is any of zero and 1 to 10; and $R^2$ is a substituent group containing an organosiloxane group, each of $R^3$, $R^4$ and $R^5$, independently, is a group of $R^1$ or is a group having a heterocyclic group, or $R^4$ and $R^5$, together with the nitrogen atom to which they are attached form a heterocyclic group which may additionally contain any of oxygen, nitrogen, sulfur and silicon)

and further the general formula (1) satisfies one of the following features (i) to (iii), (i) n=1

(ii) m and n are zero, and p is 1

(iii) m, n and p are zero, and $R^1$ is other than hydrogen or methyl.

PREFERRED EMBODIMENT OF THE INVENTION

The plastic articles for medical use of the present invention are made of a polymer having, as pendant function groups, amino and organosiloxane groups. It is preferable that the amino group and organosiloxane group are arranged in this order from the main hydrocarbon chain skeleton of the polymer.

In the above general formula, X is an ethylenically unsaturated polymerizable group, preferably selected from $CH_2=C(R)-COO-$, $CH_2=C(R)CO-$, $CH_2=C(R)COO(CH_2)_2NHCO-$ and the groups represented by the following formulae:

wherein Ph is a phenyl group.

More preferably, the respective groups (2) and (3) are:

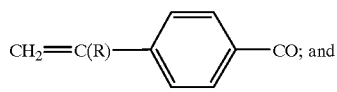

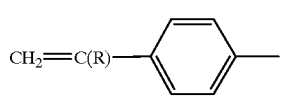

The values of m and n in the above general formula (1) depending upon the choice of polymerizable group. When the polymerizable group is $CH_2=C(R)-COO-$, each of m and n is 1. When the polymerizable group is $CH_2=C(R)CO-$, $CH_2=C(R)COO(CH_2)_2NHCO-$ or a group represented by formula (2), each of m and n is zero. When it is a group represented by formula (3), m is 0 and n is 1.

When n is 1, $R^1$ may be a hydrogen atom, an unsubstituted or substituted alkyl group, an unsubstituted or substituted aryl group, $(CH_2)_rCOOR^3$ or $(CH_2)_rCONR^4R^5$. However, polymers per se wherein n and p are zero and $R^1$ is a hydrogen atom or an methyl group are known. In such a case, it is difficult to to achieve a good balance between wettability, mechanical properties and transparency. However, these properties are improved by replacing the hydrogen or methyl group bound to the nitrogen with, such as, $CH_2CH_2COOCH_3$, $CH_2CH_2COOCH_2CH_2OH$ and $C_4H_9$ groups. When p is 1, these properties can also be improved because of another amino group even if $R^1$ is a hydrogen atom or an methyl group. The alkyl group can be linear or branched, but it is preferable, to keep good transparency, that the alkyl group has 1 to 20 carbon atoms, more preferably 1 to 10 carbon atoms and hence can be, for example, a methyl group, ethyl group, propyl group, isopropyl group, n-butyl group, sec-butyl group, t-butyl group, n-pentyl group, neopentyl group, n-hexyl group, n-heptyl group or n-octyl group. As the substituted alkyl group, a group represented by the following general formula:

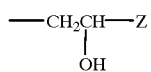

(6)

which is an alkyl group with a hydroxyl group, is preferable to improve wettability. In the formula, Z is a hydrogen atom, an alkyl group, an alkoxy group, or an aryl group, which alkyl or aryl groups or moieties are more preferably $C_{1-5}$ alkyl moieties which may be partially substituted. The alkyl group with a hydroxyl group can be, for example, a 2-hydroxyethyl group, 2-hydroxypropyl group, 2,3-dihydroxypropyl group, 2-hydroxybutyl group, 2-hydroxypentyl group, 2-hydroxyhexyl group, 3-methoxy-2-hydroxypropyl group, 3-ethoxy-2-hydroxypropyl group or allyl group. It is preferable that Z is a hydrogen atom to give a 2-hydroxyethyl group (6) or $CH_2OH$.

The aryl group is not especially limited, but it is preferable to keep good transparency, that the aryl group has 6 to 20 carbon atoms and hence can be, for example, a phenyl group, 4-hydroxyphenyl group, 4-carboxyphenyl group, 2-methoxyphenyl group, 4-methoxyphenyl group, 2-methylphenyl group, 4-methylphenyl group or naphthyl group.

$R^4$ and $R^5$, together with $N(CH_2)_q$, may form a heterocyclic ring which may additionally contain any of oxygen, nitrogen, sulfur and silicon, for example, a morpholine skeleton.

$R^3$ in $(CH_2)_rCOOR^3$ and $R^4$ and $R^5$ in $(CH_2)_rCONR^4R^5$, which are respective additional alternative groups of $R^1$ may be, independently, a hydrogen atom, an alkyl group, an aryl group, an alkyl group with a substituent group, or an aryl group with a substituent group. Each of $R^3$, $R^4$ and $R^5$ can be the same as, or different from, the others. Alternatively, each of $R^4$ and $R^5$, together with the nitrogen atom to which they are attached, may form a heterocyclic group such as a morpholino group.

The alkyl group can be linear or branched, but, to obtain both of good mechanical properties and good transparency, it is preferable that the alkyl group has 1 to 10 carbon atoms, more preferably $C_{1-5}$ alkyl and hence can be, for example, a methyl group, ethyl group, propyl group or butyl group.

The aryl group is not especially limited, but it is preferable that the aryl group has 6 to 20 carbon atoms and hence can be, for example, a phenyl group or naphthyl group.

In the alkyl or aryl group with a substituent group, which is a group of $R^1$, $R^3$, $R^4$ and $R^5$, the substituent group can be a hydroxyl group, fluorine atom, bromine atom, iodine atom, amino group, ester group or amido group. It is also preferable to use an alkyl group with an ether bond, for example, a $C_{2-3}$ alkylene oxide chain containing group, to improve wettability.

The alkyl group with a substituent group can be, for example, a 2-hydroxyethyl group, 3-hydroxypropyl group, 4-hydroxybutyl group, 2-methoxyethyl group, 2-ethoxyethyl group, trifluoroethyl group or hexafluoroisopropyl group.

It is also preferable to improve mechanical properties that $R^4$ and $R^5$ are connected to one another by any one or more of a carbon atom, oxygen atom, nitrogen atom, sulfur atom or silicon atom, to form a cyclic group, for example, a cyclopentyl group, cyclohexyl group, 3-oxacyclopentyl group, 3-azacyclopentyl group or morpholine skeleton. In other words, each of $R^4$ and $R^5$ together form a cyclic group which may contain, in the ring, any carbon atoms, but which, alternatively, may contain at least one of the above hetero atoms.

It is preferable to improve both of mechanical properties and wettability, that each of $R^3$, $R^4$ and $R^5$, independently, is a $C_{1-5}$ alkyl group, and more preferable to improve wettability, that $R^3$ is an alkyl group with a hydroxyl group while each of $R^4$ and $R^5$, independently, is an ethyl group, methyl group or hydrogen atom. $R^4$ and $R^5$ can be the same as, or different from, one another.

In the general formula (1), q may be an integer of 1 to 10. In this case, an integer of 1 to 5 is preferable, and an integer of 1 to 3 is more preferable to improve gas permeability. Furthermore in the general formula (1), r may be an integer of 1 to 10. In this case, an integer of 1 to 5 is preferable, and 2 is more preferable.

$R^2$ is a substituent group containing an organosiloxane with one or more siloxane bonds, and it is preferable to improve gas permeability that $R^2$ is represented by the following general formula:

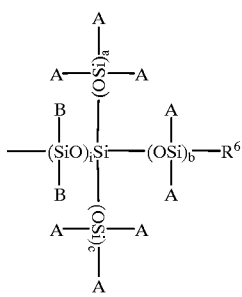

(4)

where each of A and B stands for, respectively independently, an alkyl group with 1 to 5 carbon atoms, phenyl group or fluoroalkyl group with 1 to 10 carbon atoms. It is preferable to achieve good gas permeability that the alkyl group is a methyl group or ethyl group, and that the fluoroalkyl group is a trifluoromethyl group or pentafluoroethyl group. i stands for an integer of 0 to 200. In this case, an integer of 0 to 50 is preferable to keep good transparency, and an integer of 0 to 10 is more preferable. a, b and c stand for, respectively independently, an integer of 0 to 20 (but excluding a case of i=a=b=c=0). In this case, it is preferable to keep good transparency that a, b and c stand for, respectively independently, an integer of 0 to 5, and a=b=c=1 is more preferable.

It is preferable that $R^6$ which is a substituent group with 1 or more carbon atoms is an alkyl group with 1 to 5 carbon atoms, phenyl group or fluoroalkyl group and one preferred group of $R^1$ is the tris(trimethylsiloxy)silyl group. An alternative preferred group of $R^6$ is a substituent group containing an organosiloxane group represented by the following general formula:

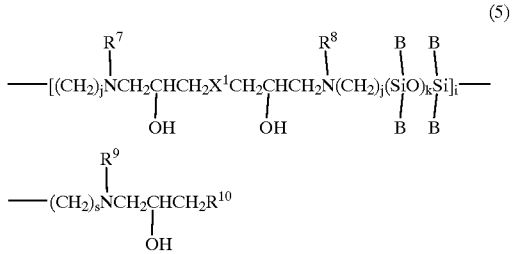

(5)

where each of $R^7$, $R^8$ and $R^9$, independently, a hydrogen atom, an alkyl group or an aryl group, and these groups can also be partially substituted; $R^{10}$ is a group with a polymerizable double bond; $X^1$ is an alkylene or arylene optionally containing at least one oxygen atom at either end or interrupted thereby, an oxygen atom; B is a $C_{1-5}$ alkyl group, phenyl group or fluoroalkyl group; l is zero or is 1 to 50; k is zero or is 1 to 200; and each of the js and s is, independently, 1 to 6. Preferably, l is 0. X' can, for example, be an alkyl group with an ether bond represented by —O—Y—O—, where Y stands for an alkyl group, aryl group or an alkyl group with an ether bond. Each of the above alkyl and alkylene groups preferably has 1 to 5 carbon atoms and each aryl or arylene group preferably has from 6 to 20 carbon atoms.

Furthermore, in the above general formula, it is preferable to improve both of mechanical properties and transparency, that $R^{10}$ is $CH_2$=C(R)—COO (R is a hydrogen atom or methyl group, preferably, to improve both of mechanical properties and transparency, a methyl group).

The monomer represented by the general formula (1) can be, for example, any of the following:

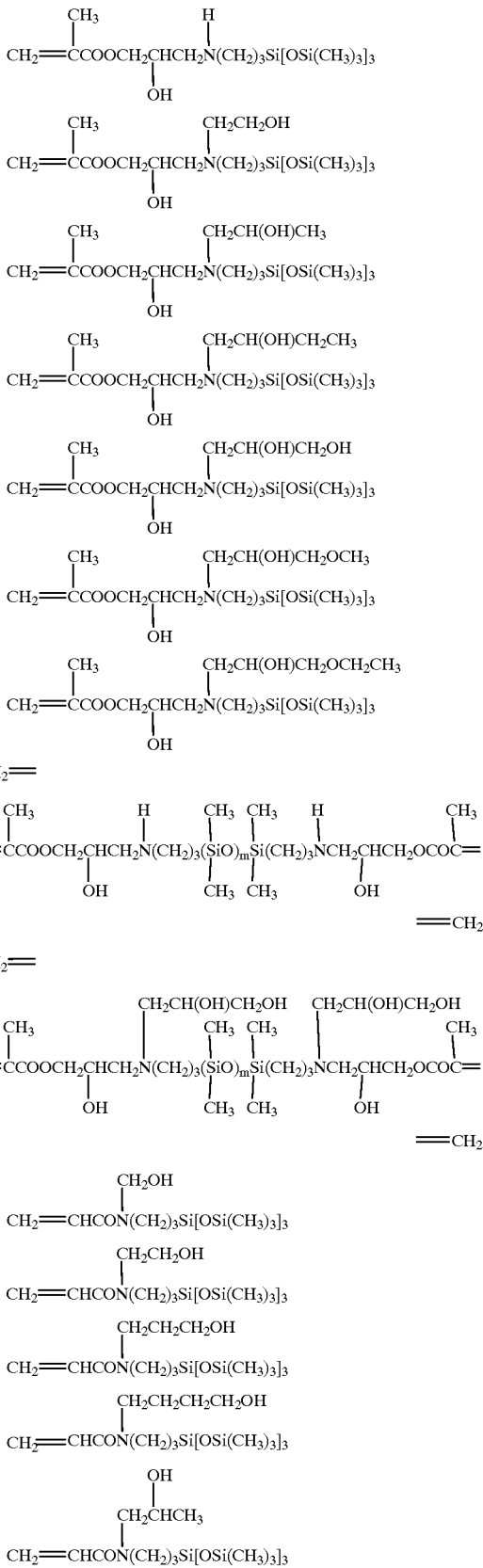

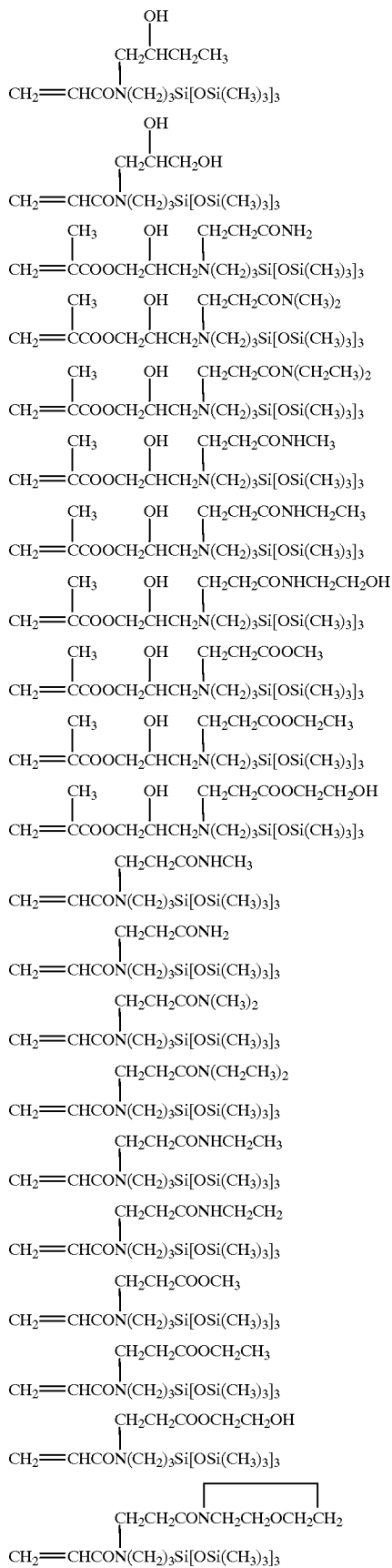
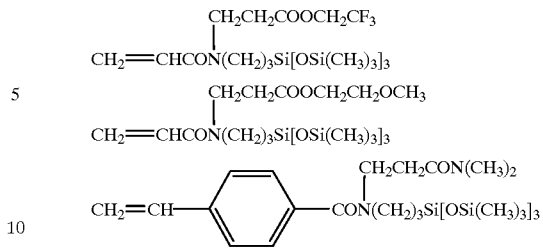

The plastic articles for medical use obtained in the present invention may be a copolymer which comprises, in addition to the above mentioned units derived from a monomer having amino and organosiloxane groups, at least one other unit derived from a monomer with a copolymerizable double bond, for example, a (meth)acryloyl group, styryl group, allyl group, vinyl group or indeed any other copolymerizable double bond. In this case, the content of the units derived from the monomer represented by the general formula (1) in the plastic articles for medical use is not especially limited. However, it is preferable that the content is at least 5 wt %, and the content can be 100 wt %. If the content is less than 5 wt %, an excellent balance between oxygen permeability and mechanical properties tends to be lost.

For copolymerization, a hydrophilic monomer with any of the above double bonds, and a hydroxyl group, amido group, amino group, carboxyl group, polyalkylene glycol group, terminal alkoxy polyalkylene glycol group, lactam skeleton or morpholine skeleton, can be used to provide plastic articles for medical use excellent in flexibility, hydrophilicity and gas permeability, which can be suitably used, for example, as soft contact lenses or soft intra-ocular lenses.

The hydrophilic monomers which can be used here include hydroxyalkyl (meth)acrylates such as 2-hydroxyethyl (meth)acrylate, hydroxypropyl(meth)acrylate, hydroxybutyl(meth)acrylate and 2,3-dihydroxypropyl(meth)acrylate, (alkyl)aminoalkyl (meth)acrylates such as dimethylaminoethyl(meth)acrylate, diethylaminoethyl (meth)acrylate and dibutylaminoethyl (meth)acrylate, acrylamides such as N,N-dimethylacrylamide, N-(isobutoxymethyl)acrylamide, N-(n-butoxymethyl)acrylamide, N,N-diethylacrylamide and N-(1,1-dimethyl-3-oxobutyl)acrylamide, morpholines such as acryloylmorpholine, morpholinomethyl (meth)acrylate and morpholinoethyl (meth)acrylate, unsaturated carboxylic acids such as (meth)acrylic acid, itaconic acid, maleic acid, fumaric acid and crotonic acid and derivatives such as acid anhydrides (in the case of dibasic acids), polyalkylene glycol mono(meth)acrylates such as diethylene glycol mono(meth)acrylate, tetraethylene glycol mono(meth)acrylate, polyethylene glycol mono(meth)acrylate and polypropylene glycol mono(meth)acrylate, N-vinyl heterocyclic monomers such as N-vinylpyrrolidone, N-vinylpyridine and N-caprolactam, and styrenes such as aminostyrene and hydroxystyrene.

Among these hydrophilic monomers, a monomer having excellent compatibility with the other polymerizable component and excellent effects of improving the hydrophilicity and mechanical properties of the plastic articles obtained is selected to be used. Preferable monomers include alkyl (meth)acrylamides, morpholines and (alkoxy) polyalkylene glycol mono(meth)acrylates.

One or more as a mixture of these hydrophilic monomers can be used. If the amount of the hydrophilic monomer added is properly adjusted, the physical properties of the plastic articles obtained can be controlled. For example, if it is intended to obtain soft contact lenses excellent in flexibility and hydrophilicity and high in gas permeability, the amount of the hydrophilic monomer added is 20 wt % to 70 wt % based on the weight of the polymerizable components. A content of 30 wt % to 60 wt % is preferable. If the amount of the hydrophilic monomer is too small, the effects of improving the hydrophilicity and flexibility tend to be less manifested, and if too large on the contrary, mechanical properties tend to be poor. If it is intended to obtain plastic articles with a low water content and high gas permeability, it is desirable that the amount of the hydrophilic monomer is 50 wt % or less at most.

For preparing a polymer for use in the present invention, an additional monomer component containing a double bond and silicon can also be used. For example, if a polysiloxane macromer in which one or more polymerizable groups are bonded to the main siloxane chain through a urethane bond, direct coupling or an alkylene group is used, impact resistance can be controlled by ensuring that the microstructure of the plastic articles obtained becomes a microhetero phase structure. Furthermore, a known silicon-containing alkyl methacrylate or silicon-containing styrene derivative, can also be used in addition to the polysiloxane macromer.

The silicon-containing alkyl (meth)acrylates which can be used here include, for example, tris(trimethylsiloxy)silylpropyl (meth)acrylate, tris(trimethylsiloxy)silylpropylglyceryl(meth)acrylate, methylbis(trimethylsiloxy)silylpropyl (meth)acrylate, trimethylsiloxydimethylsilylpropyl (meth)acrylate, etc. The silicon-containing styrene derivatives which can be used here include tris(trimethylsiloxy)silylstyrene and trimethylsilylstyrene.

One or more as a mixture of these polysiloxane macromers, silicon-containing alkyl methacrylates and silicon-containing styrene derivatives can be used, but in this case, their amount must be 50 wt % or less based on the weight of the amine compound of the present invention. If the amount is larger than this, the effects of the amine compound of the present invention to manifest transparency, gas permeability, good wettability and mechanical properties are inhibited.

In the present invention, to adjust the mechanical properties such as hardness of the articles obtained, it is also possible to use any of alkyl (meth)acrylates, alkyl substituted styrenes, fumarates, itaconates, and methacrylates and styrenes with their hydrocarbon groups partially substituted by a halogen atom, particularly fluorine atom. These monomers include, for example, linear, branched or cyclic allyl (meth)acrylates such as methyl (meth)acrylate, ethyl (meth)acrylate, isopropyl (meth)acrylate, t-butyl (meth)acrylate, cyclohexyl (meth)acrylate, n-bomyl (meth)acrylate and isobornyl (meth)acrylate, alkoxyalkyl (meth)acrylates such as ethoxyethyl (meth)acrylate and methoxyethyl (meth)acrylate, styrenes such as α-methylstyrene and t-butylstyrene, fumarates such as di-t-butyl fumarate and di-isopropyl fumarate, itaconates such as dimethyl itaconate and diethyl itaconate, fluorine substituted alkyl (meth)acrylates such as 2,2,2-trifluoroethyl (meth)acrylate and 2,2,2,2',2',2'-hexafluoroisopropyl (meth)acrylate, and halogen substituted styrenes such as chloromethylstyrene.

One or more as a mixture of these monomers for hardness adjustment can be used. By adjusting the amount of the monomer added, the physical properties of the plastic articles obtained can be controlled. For example, if it is intended to obtain soft contact lenses with high hardness and gas permeability, it is desirable that the amount of the monomer added for hardness adjustment is 20 wt % to 70 wt % based on the weight of the polymerizable components. A content of 30 wt % to 60 wt % is preferable. If the amount of the monomer for hardness adjustment is too small, the effect of improving hardness tends to be less manifested, and if too large on the contrary, gas permeability is lowered. Furthermore, if it is intended to obtain hydrated flexible plastic articles with high gas permeability, it is desirable that the amount of the monomer added for hardness adjustment is 50 wt % or less at the most.

Furthermore in the present invention, to improve the shape integrity and durability of the plastic articles obtained, it is possible to use a crosslinking agent with two or more polymerizable double bonds. The monomers which can be used as crosslinking agents include polyfunctional (meth)acrylates such as ethylene glycol di(meth)acrylate, diethylene glycol di(meth)acrylate, triethylene glycol di(meth)acrylate, trimethylolpropane tri(meth)acrylate and glycerol di(meth)acrylate, aromatic polyfunctional monomers such as divinylbenzene and diallyl phthalate, acrylamides such as methylenebisacrylamide.

One or more as a mixture of these crosslinking agents can be used. It is desirable that the amount of the crosslinking agent added is 0.01 wt % to 10 wt % based on the weight of the polymerizable components, and an amount of 0.1 wt % to 5 wt % is preferable. If the amount of the crosslinking agent is too small, durability and shape integrity tend to be insufficient, and on the other hand, if too large, the plastic articles obtained tend to be insufficient in flexibility and fragile.

The plastic articles obtained can be made to have ultraviolet light absorbability and/or be colored by adding a polymerizable ultraviolet light absorber, polymerizable coloring matter or polymerizable ultraviolet light absorbable coloring matter. The ultraviolet light absorbers which can be used here include, for example, benzophenone based polymerizable ultraviolet light absorbers such as 2-hydroxy-4-(meth)acryloyloxybenzophenone, benzotriazole based polymerizable ultraviolet light absorbers such as 2-(2'-hydroxy-5'-(meth)acryloyloxypropyl-3'-t-butylphenyl)-5-chloro-2H-benzotriazole and salicylic acid derivative based polymerizable ultraviolet light absorbers such as phenyl 2-hydroxy-4-methacryloyloxymethylbenzoate.

The polymerizable coloring materials which can be used here include, for example, azo based polymerizable coloring matters such as 1-phenylazo-4-(meth)acryloyloxynaphthalene, anthraquinone based polymerizable coloring materials such as 1,5-bis((meth)acryloylamino)-9,10-anthraquinone and phthalocyanine based polymerizable coloring materials such as (meth)acryloylated tetramino copper phthalocyanine. One or more as a mixture of them can be used.

The polymerizable ultraviolet light absorbable coloring materials which can be used here include, for example, benzophenone based ultraviolet light absorbable coloring materials such as 2,4-dihydroxy-3-(p-(meth)acryloyloxymethyl phenylazo)-benzophenone and benzoic acid based coloring materials. One or more as a mixture of them can be used.

For hard plastic articles with a low water content, a coloring material which is not polymerizable, but soluble in an oil soluble monomer and is not soluble in water can also be used.

The amount of the ultraviolet light absorber or coloring matter can be adjusted to suit the intended properties of plastic articles for medical use. If these additives are added too much, the physical properties may be affected. So, it is preferable that their amount is 3 wt % or less.

In the present invention, the amine compound represented by the general formula (1) and other polymerizable compounds are polymerized by the action of heat, light (ultraviolet light or visible light), radiation or microwaves, to obtain the intended plastic articles for medical use. The polymerization can be bulk polymerization or solution polymerization with a solvent added or any other polymerization.

In the case of radical polymerization by heat, an azo compound such as azobisisobutyronitrile or azobisdimethylvaleronitrile or a peroxide such as benzoyl peroxide or t-butyl peroxide is added as a polymerization initiator. One or more as a mixture of them can be used. For polymerization by use of light, it is preferable to add a photo polymerization initiator or sensitizer. It is preferable that the amount of the polymerization initiator and sensitizer added is 0.001 to 2 wt %.

The plastic articles for medical use of the present invention can be produced by any of the following methods. The component represented by the general formula (1) and other polymerization components are bulk-polymerized in a suitable vessel, to obtain a polymer shaped like a rod, sheet or block which is then lathed into a desired form. As another method, a polymer containing the component represented by the general formula (1) and a component with a modifiable functional group is processed into a desired form which can then be modified by polymer reaction. In the case of soft plastic articles for medical use, a technique such as mold polymerization or spin cast polymerization can also be used. As another method, the polymer of the present invention can be rendered molten or dissolved by a solvent, and molded, for example, into fibers or film.

Since the polymer obtained for use in the present invention allows the substituent groups on nitrogen atoms to be freely designed, it can be very usefully used for plastic articles with oxygen permeability and good mechanical properties as described below.

The present invention can provide plastic articles with all of high oxygen permeability, good wettability, good optical properties and mechanical properties. These can be used as optical articles such as lens materials of contact lenses, plastic lenses and display materials.

EXAMPLES

Embodiments of the invention will now be described below with reference to the following Examples.

The respective properties were measured according to the following methods.

(1) A polymer was hydrated and the water content (%) of the polymer was calculated from the following formula:

Water content (%)=$(W-W_0)/W \times 100$ where W is the weight of the hydrated polymer (g) and $W_0$ is the weight of the dry polymer.

(2) Oxygen permeability coefficient

The oxygen permeability coefficient of a polymer was measured in 35° C. water using a Seikaken Type film oxygen permeability coefficient meter produced by Rika Seiki Kogyo K.K.

(3) Hardness

For measuring both Shore "A" hardness and Shore "D" hardness, a hardness tester produced by Kobunshi Keiki was used.

(4) Proton nuclear magnetic resonance spectrum

Measured by using EX270 produced by Nippon Denshi with dichloroform as the solvent.

(5) Tackiness

The tackiness was judged with reference to how tacky a sample felt when touched by the finger.

(6) Tensile strength and elongation at break

Measured by a Tensilon type tension tester produced by Toyo Sokki. The elongation at break refers to the elongation at the moment when a film was broken.

(7) Appearance and transparency

Visually observed.

Synthesis Example 1 (Synthesis of monomer A)

A 100 ml eggplant type flask was charged with 12.1 g (0.085 mol) of glycidyl methacrylate and 30.0 g (0.085 mol) of 3-aminopropyltris(trimethylsiloxane)silane, and the mixture was stirred at 60° C. for 8 hours. The reaction product was analyzed by measuring its proton nuclear magnetic resonance spectrum, and confirmed to be a compound represented by the following formula:

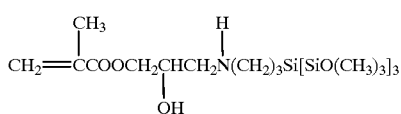

(hereinafter called monomer A).

Synthesis Example 2 (Synthesis of monomer B)

A 100 ml of eggplant type flask was charged with 6.3 g (0.085 mol) of 2,3-epoxy-1-propanol and 30.0 g (0.085 mol) of 3-aminopropyltris(triiethylsiloxy)silane, and the mixture was stirred at 60° C. for 8 hours. Then, 12.1 g (0.085 mol) of glycidyl methacrylate was added, and the mixture was stirred at 60° C. for 16 hours. The reaction product was analyzed by measuring its proton nuclear magnetic resonance spectrum, and confirmed to be a compound represented by the following formula:

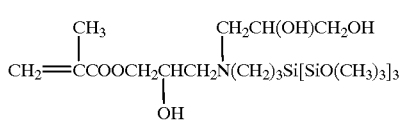

(hereinafter called monomer B).

Synthesis Example 3 (Synthesis of monomer C)

A 200 ml eggplant type flask was charged with 8.5 g of glycidyl methacrylate and 50 g of a silicone oil with amino groups at both the ends with a molecular weight of about 1500 (X-22-161A produced by Shin-Etsu Chemical Co., Ltd.), and the mixture was stirred at 60° C. for 8 hours. The reaction product was analyzed by measuring its proton nuclear magnetic resonance spectrum, and confirmed to be a compound represented by the following formula:

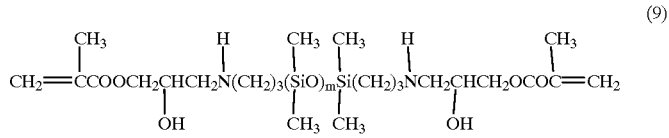

(9)

(hereinafter called polymer C).

Synthesis Example 4 (Synthesis of monomer D)

A 200 ml eggplant type flask was charged with 8.5 g of glycidyl methacrylate and 50 g of a silicone oil with amino groups at both the ends with a molecular weight of about 1500 (X-22-161A produced by Shin-Etsu Chemical Co., Ltd.), and the mixture was stirred at 60° C. for 8 hours. Then, 4.4 g of 2,3-epoxy-1-propanol was added, and the mixture was stirred at 60° C. for 8 hours. The reaction product was analyzed by measuring its proton nuclear magnetic resonance spectrum, and confirmed to be a compound represented by the following formula:

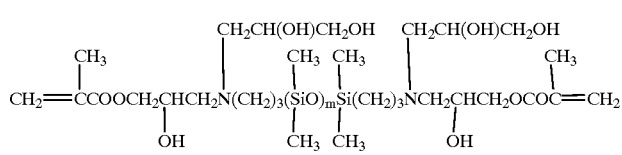

(10)

(hereinafter called monomer D).

Synthesis Example 5 (Synthesis of monomer E)

A 200 ml eggplant type flask was charged with 2.9 g of glycidyl methacrylate and 30 g of a silicone oil with amino groups at both the ends with a molecular weight of about 3000 (X-22-161B produced by Shin-Etsu Chemical Co., Ltd.), and the mixture was stirred at 60° C. for 8 hours. Then, 1.5 g of 2,3-epoxy-1-propanol was added, and the mixture was stirred at 60° C. for 8 hours. The reaction product was analyzed by measuring its proton nuclear magnetic resonance spectrum, and confirmed to be a compound represented by the following formula:

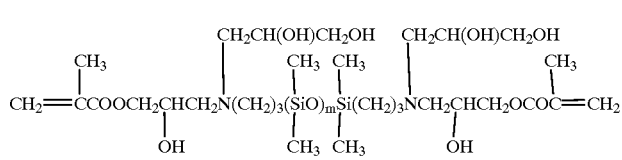

(11)

(hereinafter called monomer E).

Synthesis Example 8 (Synthesis of intermediate product F)

A 500 ml eggplant type flask was charged with 26.2 g (0.428 mol) of ethanolamine, 50.0 g (0.107 mol) of 3-iodopropyltris(trimethylsiloxy)silane and 300 ml of ethanol, and the mixture was stirred at 60° C. for 20 hours. After completion of reaction, ethanol and ethanolamine were removed under reduced pressure, and sodium hydroxide aqueous solution was added. The mixture was extracted with ethyl acetate. Ethyl acetate was removed under reduced pressure, and the residue was distilled under reduced pressure, to obtain a transparent liquid. The liquid was analyzed by measuring its proton nuclear magnetic resonance spectrum, and confirmed to be a compound represented by the following formula:

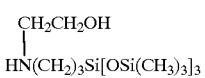

(12)

(hereinafter called intermediate product F).

Synthesis Example 9 (Synthesis of monomer F)

In a stream of nitrogen, a 100 ml three-neck flask was charged with 5.0 g (0.0126 mol) of the intermediate product A, 1.27 g (0.0126 mol) of triethylamine and 20 ml of ethyl acetate, and the mixture was cooled. To the solution, 1.14 g (0.0126 mol) of acrylic acid chloride was added dropwise, and the mixture was stirred at 0° C. for 6 hours and at room temperature for 30 minutes. The precipitate was filtered away, and the solvent was removed under reduced pressure. The remaining solution was column-separated using silica gel, to obtain a transparent liquid. The liquid was analyzed by measuring its proton nuclear magnetic resonance spectrum, and confirmed to be a compound represented by the following formula:

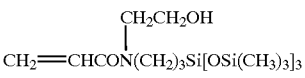

(13)

(hereinafter called monomer F).

Synthesis Example 10 (Synthesis of intermediate product G)

A 1-liter eggplant type flask was charged with 28 g (0.28 mol) of N,N-dimethylacrylamide, 100 g (0.28 mol) of 3-aminopropyltris(trimethylsiloxy)silane and 400 ml of ethanol, and the mixture was stirred at room temperature for 5 days. After completion of reaction, ethanol and N,N-dimethylacrylamide were removed under reduced pressure, and the residue was distilled under reduced pressure to obtain a transparent liquid. The liquid was analyzed by measuring its proton nuclear magnetic resonance spectrum, and confirmed to be a compound represented by the following formula:

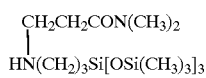
(14)

(hereinafter called intermediate product G).

Synthesis Example 11 (Synthesis of monomer G)

A 100 ml eggplant type flask was charged with 50 g (0.11 mol) of intermediate product G and 16 g (0.11 mol) of glycidyl methacrylate, and the mixture was stirred at 60° C. for 18 hours. The liquid obtained was analyzed by measuring its proton nuclear magnetic resonance spectrum, and confirmed to be a compound represented by the following formula:

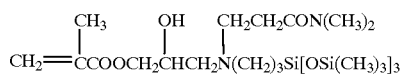
(15)

(hereinafter called monomer G).

Synthesis Example 12 (Synthesis of monomer H)

A 1-liter eggplant type flask was charged with 100 g (0.22 mol) of intermediate product G, 400 ml of ethyl acetate and 200 ml of sodium hydroxide aqueous solution, and the mixture was cooled. To the solution, 24 g (0.26 mol) of acrylic acid chloride was added dropwise. After completion of dropwise addition, the reaction solution was stirred at room temperature for 6 hours. The ethyl acetate layer was separated, and ethyl acetate was removed under reduced pressure. The residue was distilled under reduced pressure to obtain a liquid. The liquid was analyzed by measuring its proton nuclear magnetic resonance spectrum, and confirmed to be a compound represented by the following formula:

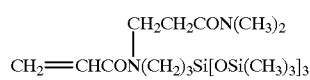
(16)

(hereinafter called monomer H).

Synthesis Example 13 (Synthesis of monomer I)

A 500 ml eggplant type flask was charged with 50 g (0.11 mol) of intermediate product G, 19 g (0.12 mol) of chloromethylstyrene and 300 ml 1 of ethyl acetate, and the mixture was stirred at 80° C. for 8 hours. To the reaction solution, sodium hydroxide aqueous solution was added, and the mixture was stirred. The ethyl acetate layer was separated and ethyl acetate was removed under reduced pressure. The residue was distilled under reduced pressure to obtain 28 g of a light yellow liquid. The liquid was analyzed by measuring its proton nuclear magnetic resonance spectrum, and confirmed to be a compound represented by the following formula:

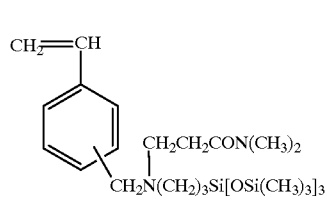
(17)

(hereinafter called monomer I).

Synthesis Example 14 (Synthesis of monomer J)

A 200 ml eggplant type flask was charged with 2.0 g (0.0135 mol) of 4-vinylbenzoic acid and 100 ml of dichloromethane, and the mixture was cooled in an ice bath. To the solution, 2.7 g (0.0140 mol) of 1-ethyl-3-(3-dimethylaminopropyl)carbodiimide hydrochloride was added, and the mixture was stirred for 30 minutes. Furthermore, 5.0 g (0.0141 mol) of 3-aminopropyltris(trimethylsiloxy)silane was added, and the mixture was stirred at room temperature for 8 hours. The reaction solution was poured onto ice, and the dichloromethane layer was washed by hydrochloric acid aqueous solution, sodium hydrogencarbonate aqueous solution and sodium chloride aqueous solution. Dichloromethane was removed under reduced pressure, and the residue was column-separated, to obtain 3.2 g of a milky white solid. The solid was analyzed by measuring its proton nuclear magnetic resonance spectrum, and confirmed to be a compound represented by the following formula:

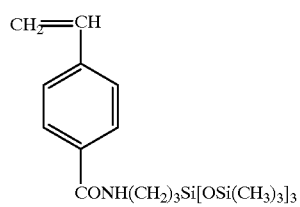
(18)

(hereinafter called monomer J).

Examples 1 to 7 and Comparative Example 1

Monomer A or monomer B, N,N-dimethylacrylamide and/or 2-hydroxyethyl methacrylate, and ethylene glycol dimethacrylate were mixed, and 0.3 part of azobisisobutyronitrile was added as a polymerization initiator against 100 parts of the monomers. The mixture was added into a test tube with a diameter of 18 mm and a height of 180 mm. The monomer mixture was degassed in argon atmosphere, sealed, polymerized at 40° C. for 48 hours, heated from 40° C. to 110° C., taking 24 hours, and kept at 110C for 4 hours, to obtain a polymer. In this way, five polymers of the present invention were obtained. Their appearance, transparency, tackiness, Shore "D" hardnesses, Shore "A" hardnesses after hydration, and oxygen permeability coefficients were judged or measured. All the samples were transparent, free from tackiness, soft in hardness after hydration, and sufficiently high in oxygen permeability coefficient. On the contrary, a polymer obtained by using tris(trimethylsiloxy)silylpropyl methacrylate instead of the monomer A or B was cloudy as shown in the following table. The respective oxygen permeability coefficients were measured in ×10–11 ml(STP) cm/(cm² sec mmHg).

contents were judged or measured. All the polymers obtained were transparent and highly flexible. On the contrary, when a compound with a molecular weight of about 3000 represented by the following formula (X-22-164B produced by Shin-Etsu Chemical Co., Ltd.) was used as a similar macromer, the polymer obtained was cloudy.

|  | Example | | | | | | | Comparative |
|---|---|---|---|---|---|---|---|---|
|  | 1 | 2 | 3 | 4 | 5 | 6 | 7 | Example 1 |
| Monomer A | 50 | 60 | 60 | 0 | 0 | 0 | 100 | 0 |
| Monomer B | 0 | 0 | 0 | 50 | 50 | 100 | 0 | 0 |
| Tris(methylsiloxy)silylpropyl methacrylate | 0 | 0 | 0 | 0 | 0 | 0 | 0 | 50 |
| N,N-dimethylacrylamide | 50 | 40 | 20 | 0 | 50 | 0 | 0 | 0 |
| 2-hydroxyethyl methacrylate | 0 | 0 | 20 | 50 | 0 | 0 | 0 | 50 |
| Ethylene glycol dimethacrylate | 1 | 1 | 1 | 1 | 1 | 1 | 1 | 1 |
| Appearance | Transparent | | | | | | | Cloudy |
| Tackiness | Not tacky | | | | | | | |
| Shore "D" hardness | 80 | 70 | 65 | 82 | 82 | | | |
| Shore "A" hardness after hydration | 10 | 15 | 15 | 75 | 55 | | 0 | |
| Water content | 55 | 44 | 26 | 15 | 41 | 11 | 4 | |
| Oxygen permeability coefficient | 47 | 77 | 59 | | | | | |

Examples 8 and 9

Sixty parts of monomer A, and 40 parts of a hydrophilic monomer alone or a mixture consisting of a hydrophilic monomer and a hydrophobic monomer, and 1 part of ethylene glycol dimethacrylate were mixed, and 0.3 part of azobisisobutyronitrile was added as a polymerization initiator. The mixture was added into a test tube with a diameter of 18 mm and a height of 180 mm. The monomer mixture was degassed in argon atmosphere, polymerized between plates at 40° C. for 48 hours, heated from 40° C. to 110° C., taking 24 hours, and kept at 110° C. for 4 hours, to obtain a film sample. In this way, two samples were obtained. Their transparency after hydration, water contents and tensile strengths and elongations were examined. As shown in the following table, the polymers obtained were transparent and excellent in mechanical properties.

|  | Example | |
|---|---|---|
|  | 8 | 9 |
| Hydrophilic monomer or hydrophobic monomer | Diethylacrylamide (40) | Dimethylacrylamide (30) Trifluoroethyl methacrylate (10) |
| Appearance | Transparent | Transparent |
| Water content | 8 | 25 |
| Tensile strength (kg/cm2) | 26 | 13 |
| Tensile elongation (%) | 160 | 115 |

Examples 10 to 12 and Comparative Example 2

Forty parts of monomer C, or monomer D, or monomer E respectively as a macromer, 60 parts of N,N-dimethylacrylamide and 1 part of ethylene glycol dimethacrylate were mixed, and 0.3 part of azobisisobutyronitrile was added as a polymerization initiator. The mixture was processed as described in Example 1, to obtain a polymer. In this way, three polymers of the present invention were obtained. Their appearance, tackiness, Shore "D" hardnesses, Shore "A" hardnesses after hydration and water $$CH_2=CCOOCH_2CH_2CH_2(\underset{\underset{CH_3}{|}}{\overset{\overset{CH_3}{|}}{Si}}O)_n\underset{\underset{CH_3}{|}}{\overset{\overset{CH_3}{|}}{Si}}CH_2CH_2CH_2OCOC=CH_2 \quad (19)$$

|  | Example | | | Comparative |
|---|---|---|---|---|
|  | 10 | 11 | 12 | Example 2 |
| Monomer C | 40 | 0 | 0 | 0 |
| Monomer D | 0 | 40 | 0 | 0 |
| Monomer E | 0 | 0 | 40 | 0 |
| [Chemical Formula 19] Macromer | 0 | 0 | 0 | 40 |
| N,N-dimethylacrylamide | 60 | 60 | 60 | 60 |
| Ethylene glycol dimethacrylate | 1 | 1 | 1 | 1 |
| Appearance | Transparent | Transparent | Transparent | Cloudy |
| Tackiness | Not tacky | Not tacky | Not tacky | |
| Shore "D" hardness | 70 | 70 | 69 | |
| Shore "A" hardness after hydration | 10 | 15 | 15 | |
| Water content | 48 | 53 | 49 | |

Examples 13 to 15 and Comparative Example 3

Sixty parts of monomer F, 40 parts in total of N,N-dimethylacrylamide and/or 2-hydroxyethyl methacrylate and 1 part of ethylene glycol dimethacrylate were mixed, and 0.3 part of azobisisobutyronitrile was added as a polymerization initiator. The mixture was processed as described in Examples 1 and 8, to obtain a polymer. In this way, three polymers of the present invention were obtained. Their appearance, tackiness, Shore "D" hardnesses, Shore "A" hardnesses after hydration and water contents were judged or measured. The strengths and elongations of the films obtained by inter-plate polymerization were also measured. As a result, the polymers obtained were found to be excellent in the balance between transparency and mechanical properties. On the contrary, when tris(trimethylsiloxy)

silylpropyl methacrylate was used as a conventional monomer instead of monomer F, the polymer obtained was cloudy.

|  | Example | | | Comparative |
| --- | --- | --- | --- | --- |
|  | 13 | 14 | 15 | Example 3 |
| Monomer F | 60 | 60 | 60 | 0 |
| Tris(trimethylsiloxy) silylpropyl methacrylate | 0 | 0 | 0 | 60 |
| N,N-dimethylacrylamide | 40 | 0 | 20 | 0 |
| 2-hydroxyethyl methacrylate | 0 | 40 | 20 | 40 |
| Ethylene glycol dimethacrylate | 1 | 1 | 1 | 1 |
| Appearance | Transparent | | | Cloudy |
| Tackiness | Not tacky | | |  |
| Shore "D" hardness | 77 | 76 | 76 |  |
| Shore "A" hardness after hydration | 32 | 95 | 60 |  |
| Water content | 35 | 10 | 21 |  |
| Tensile strength | 15 |  |  |  |
| Elongation | 240 |  |  |  |

Examples 16 to 19

Sixty parts of monomer G, 40 parts in total of N,N-dimethylacrylamide and/or 2-hydroxyethyl methacrylate and 1 part of ethylene glycol dimethacrylate were mixed, and 0.3 part of azobisisobutyronitrile was added as a polymerization initiator. The mixture was processed as described in Examples 1 and 8, to obtain a polymer. In this way, four polymers of the present invention were obtained. Their appearance, tackiness, Shore "D" hardnesses, Shore "A" hardnesses after hydration and water contents were judged or measured. Furthermore, the strengths and elongations of the films obtained by inter-plate polymerization were also measured. As a result, the polymers obtained were excellent in the balance between transparency and mechanical properties.

|  | Example | | | |
| --- | --- | --- | --- | --- |
|  | 16 | 17 | 18 | 19 |
| Monomer G | 60 | 60 | 60 | 60 |
| N,N-dimethylacrylamide | 40 | 0 | 20 | 30 |
| 2-hydroxyethyl methacrylate | 0 | 40 | 20 | 10 |
| Ethylene glycol dimethacrylate | 1 | 1 | 1 | 1 |
| Appearance | Transparent | Transparent | Transparent | Transparent |
| Tackiness | Not tacky | Not tacky | Not tacky | Not tacky |
| Shore "D" hardness | 78 | 76 | 75 | 77 |
| Shore "A" hardness after hydration | 12 | 75 | 31 | 20 |
| Water content | 42 | 10 | 21 | 31 |
| Tensile strength | 5 |  | 13 | 7 |
| Elongation | 100 |  | 150 | 130 |

Examples 20 to 22

Sixty grams of monomer G, 40 parts of a hydrophilic monomer alone or a mixture consisting of a hydrophilic monomer and a hydrophobic monomer and 1 part of ethylene glycol dimethacrylate were mixed and 0.3 part of azobisisobutyronitrile was added as a polymerization initiator. The mixture was processed as described in Example 8, to obtain a sample. In this way, three samples of the present invention were obtained. Their appearance, water contents and tensile strengths and elongations after hydration were judged or measured. As shown in the following table, the polymers obtained were transparent and excellent in mechanical properties.

|  | Example | | |
| --- | --- | --- | --- |
|  | 20 | 21 | 22 |
| Hydrophilic monomer or hydrophobic monomer | Acryloyl-morpholine (40) | Dimethyl-aminoethyl acrylate (40) | Acryloyl-morpholine (20) 2-hydroxyethyl methacrylate (20) |
| Appearance | Transparent | Transparent | Transparent |
| Water content | 25 | 14 | 17 |
| Tensile strength (kg/cm2) | 10 | 19 | 18 |
| Tensile elongation (%) | 190 | 240 | 130 |

Examples 23 to 27

Monomer H and N,N-dimethylacrylamide were mixed at any of various rates, and 1 part of ethylene glycol dimethacrylate and 0.3 part of azobisisobutyronitrile as a polymerization initiator were added. The mixture was polymerized as described in Examples 1 and 8. In this way, five polymers of the present invention were obtained. Their transparency, oxygen permeability coefficients and mechanical properties after hydration were judged and measured. The results are shown in the following table. All the polymers obtained were found to be homogeneous, transparent and excellent in oxygen permeability coefficient and mechanical properties.

|  | Example | | | | |
| --- | --- | --- | --- | --- | --- |
|  | 23 | 24 | 25 | 26 | 27 |
| Monomer H | 20 | 40 | 50 | 60 | 80 |
| N,N-dimethylacrylamide | 80 | 60 | 50 | 40 | 20 |
| Ethylene glycol dimethacrylate | 1 | 1 | 1 | 1 | 1 |
| Appearance | Transparent | Transparent | Transparent | Transparent | Transparent |
| Water content | 77 | 64 | 48 | 37 | 28 |
| Oxygen permeability coefficient | 50 | 45 | 43 | 55 | 95 |
| Tensile strength | 4 | 7 | 10 | 11 | 18 |
| Elongation at break | 140 | 215 | 280 | 260 | 340 |

Examples 28 to 31

Ten parts of a hydrophilic monomer or hydrophobic monomer and 1 part of ethylene glycol dimethacrylate were mixed with 60 parts of monomer H and 30 parts of N,N-dimethylacrylamide, and 0.3 part of azobisisobutyronitrile was added as a polymerization initiator. The mixture was processed as described in Examples 1 and 8, to obtain a polymer. In this way, four polymers of the present invention were obtained. Their transparency, water contents, oxygen permeability coefficients and tensile strengths and elongations after hydration were judged or measured. As shown in the following table, the polymers obtained were transparent and excellent in mechanical properties.

|  | Example | | | |
| --- | --- | --- | --- | --- |
|  | 28 | 29 | 30 | 31 |
| Hydrophilic monomer or hydrophobic monomer | 2-hydrox-y-ethyl | Methyl meth- | Trifluoro-ethyl | Hexafluoro- |

21
-continued

| | Example | | | |
|---|---|---|---|---|
| | 28 | 29 | 30 | 31 |
| | meth-acrylate | acrylate | meth-acrylate | isopropyl methacrylate |
| Appearance | Transparent | Transparent | Transparent | Transparent |
| Water content | 31 | 28 | 27 | 28 |
| Tensile strength (kg/cm2) | 12 | 14 | 22 | 23 |
| Tensile elongation (%) | 260 | 280 | 280 | 270 |
| Oxygen permeability coefficient | 70 | 45 | 68 | 71 |

Examples 32 to 34

Sixty parts of monomer I, 40 parts in total of N,N-dimethylacrylamide and/or 2-hydroxyethyl methacrylate, 1 part of ethylene glycol dimethacrylate and 0.3 part of azobisisobutyronitrile as a polymerization initiator were mixed, and the mixture was polymerized as described in Example 8. In this way, three polymers of the present invention were obtained. As shown below, the polymers obtained were optically homogeneous and transparent, free from tackiness and good in mechanical properties.

| | Example 32 | Example 33 | Example 34 |
|---|---|---|---|
| Hydrophilic monomer | N,N-dimethyl-acrylamide (40) | 2-hydroxyethyl methacrylate (40) | N,N-dimethyl-acrylamide (20) 2-hydroxyethyl-methacrylate (20) |
| Appearance | Transparent | Transparent | Transparent |
| Water content (%) | 53 | 14 | 27 |
| Tensile elongation | 5 | 40 | 10 |
| Elongation at break | 170 | 150 | 60 |

Example 35

Sixty parts of monomer J, 40 parts of N,N-dimethylacrylamide and 1 part of ethylene glycol dimethacrylate were mixed, and 0.3 part of azobisisobutyronitrile was added as a polymerization initiator. The mixture was polymerized as described in Example 1. The polymer obtained was homogeneous, transparent and free from tackiness. The polymer was hydrated to obtain a transparent and flexible film free from tackiness.

Example 36

Sixty parts of monomer J, 20 parts of N,N-dimethylacrylamide, 20 parts of 2-hydroxyethyl methacrylate and 1 part of ethylene glycol dimethacrylate were mixed, and 0.3 part of azobisisobutyronitrile was added as a polymerization initiator. The mixture was polymerized as described in Example 1. The polymer obtained was homogeneous, transparent and free from tackiness. The polymer was hydrated to obtain a transparent and flexible film free from tackiness.

As can be seen from the above, the present invention can provide plastic articles with high transparency and oxygen permeability and good wettability and mechanical properties.

We claim:

1. A plastic article for medical use comprising a polymer, which polymer comprises units derived from an ethylenically unsaturated monomer having a chain containing amino and organosiloxane groups, wherein the monomer is represented by the following formula:

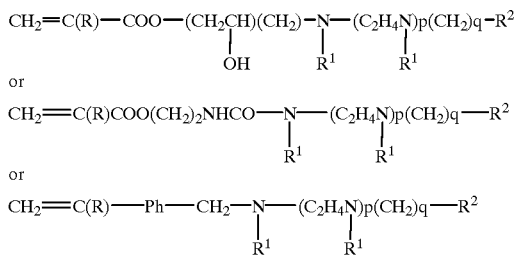

or where R is H or $CH_3$ and Ph is a phenyl group;

each $R^1$ is, independently, selected from a hydrogen atom, unsubstituted and substituted alkyl groups, an unsubstituted and substituted aryl groups and the groups $(CH_2)_rCOOR^3$ and $(CH_2)_rCONR^4R^5$;

p is selected from 0 and 1;

each of q and r, independently, is zero or 1 to 10; and $R^2$ is a substituent group containing an organosiloxane group;

$R^3$ is selected from a hydrogen atom, unsubstituted or substituted alkyl groups, and unsubstituted or substituted aryl groups and a group having a heterocyclic group:

$R^4$ and $R^5$, independently, are selected from a hydrogen atom, unsubstituted or substituted alkyl group, and unsubstituted or substituted aryl group or $R^4$ and $R^5$, together with the nitrogen atom to which they are attached, form a heterocyclic group which may additionally contain an oxygen, nitrogen, sulfur or silicon.

2. A plastic article according to claim 1, wherein the polymer has a main hydrocarbon chain and a side chain selected from a pendant chain containing an amino group or an organosiloxane group, and a crosslinking chain which comes from the crosslinking agent.

3. A plastic article according to claim 1, wherein $R^2$ is of the following formula:

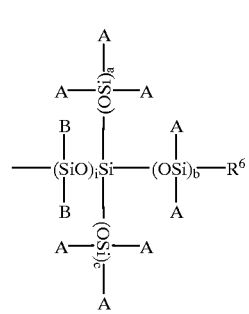

(4)

where each of A and B, independently, is a $C_{1-5}$ alkyl group, a phenyl group or a fluoroalkyl group; i is zero or 1 to 200; each of a, b and c, independently, is zero or 1 to 20 excluding i=a=b=c=o; and $R^6$ is a substituent group having at least one carbon atom.

4. A plastic article according to claim 1, wherein each $R^1$ is, independently, selected from alkyl or aryl groups, each substituted by a hydroxyl group.

5. A plastic article according to claim 1, wherein $R^1$ is the group $(CH_2)_rCOOR^3$ and $R^3$ is selected from a hydrogen atom, an alkyl group and an alkyl group substituted by any of a hydroxyl group a fluorine atom, a C2-3 alkylene oxide chain, an alkoxy group or a morpholinyl group.

6. A plastic article according to claim 1, wherein each of $R^4$ and $R^5$, independently, is selected from a hydrogen atom or an alkyl group.

7. A plastic article according to claim 3, wherein i is any of zero and 1 to 10.

8. A plastic article according to claims 3, wherein each of a, b and c is 1.

9. A plastic article according to claim 3, wherein A is a methyl group.

10. A plastic article according to claim 3, wherein $R^6$ is selected from a $C_{1-5}$ alkyl group, a phenyl group and a fluoroalkyl group.

11. A plastic article according to claim 1, wherein $R^1$ is a group of the following general formula:

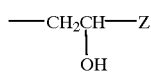
(6)

where Z is selected from the group consisting of a hydrogen atom, unsubstituted and substituted alkyl groups and unsubstituted or substituted aryl groups.

12. A plastic article according to claim 11, wherein Z is selected from a hydrogen atom or —CH$_2$OH.

13. A plastic article according to claim 1, wherein the said polymer is a copolymer which additionally comprises at least one unit derived from a monomer with a copolymerizable double bond, which monomer is other than a monomer having at least one amino group and at least one organosiloxane group.

14. A plastic article according to claim 13, wherein other monomer is selected from monomers with any of a (meth) acryloyl group, styryl group, allyl group or a vinyl group.

15. A plastic article according to claim 1, wherein the polymer is a hydrogel.

16. A plastic article according to claim 1, wherein the plastic article is a hard contact lens.

17. A plastic article according to claim 1, wherein the plastic article is a soft contact lens.

18. A plastic article according to claim 1, which is a contact lens.

19. A plastic article according to claim 18, which is a disposable contact lens.

* * * * *